US009789024B2

(12) United States Patent
Alexander

(10) Patent No.: US 9,789,024 B2
(45) Date of Patent: Oct. 17, 2017

(54) WHITE CANE NAVIGATIONAL DEVICE FOR THE VISUALLY IMPAIRED

(71) Applicant: Eric J. Alexander, Orem, UT (US)

(72) Inventor: Eric J. Alexander, Orem, UT (US)

( * ) Notice: Subject to any disclaimer, the term of this patent is extended or adjusted under 35 U.S.C. 154(b) by 0 days.

(21) Appl. No.: 14/931,624

(22) Filed: Nov. 3, 2015

(65) Prior Publication Data

US 2016/0120275 A1 May 5, 2016

Related U.S. Application Data

(60) Provisional application No. 62/074,522, filed on Nov. 3, 2014.

(51) Int. Cl.

| | |
|---|---|
| ***A61H 3/06*** | (2006.01) |
| ***A45B 3/00*** | (2006.01) |
| ***A45B 9/04*** | (2006.01) |
| *A45B 9/00* | (2006.01) |
| *H04M 1/725* | (2006.01) |
| *A61H 3/00* | (2006.01) |

(52) U.S. Cl.

CPC ................. *A61H 3/06* (2013.01); *A45B 3/00* (2013.01); *A45B 9/04* (2013.01); *A61H 3/061* (2013.01); *A45B 2009/005* (2013.01); *A61H 2003/007* (2013.01); *A61H 2201/5048* (2013.01); *A61H 2201/5097* (2013.01); *H04M 1/725* (2013.01)

(58) Field of Classification Search

CPC .. A61H 2201/5058; A61H 3/06; A61H 3/061; A61H 3/068; A61H 2201/5048; A61H 2201/5079; A45B 3/00; A45B 9/04; A45B 3/04

USPC ...... 135/65–66, 911; 340/321, 326; 367/116, 367/197–199

See application file for complete search history.

(56) References Cited

U.S. PATENT DOCUMENTS 7,267,281 B2 * 9/2007 Hopkins ................ A61H 3/061 135/911
7,467,746 B2 * 12/2008 Olmos ...................... A61F 9/08 135/65
7,706,212 B1 * 4/2010 Campbell ............. A61H 3/061 367/116
8,573,159 B1 * 11/2013 Crotty .................. A01K 15/025 119/707
8,627,839 B1 * 1/2014 Martinez .................. A45B 3/00 135/66
8,922,759 B2 * 12/2014 Gassert .................. A61H 3/061 356/3.01
9,044,374 B1 * 6/2015 Stimpson .............. A61H 3/061

(Continued)

*Primary Examiner* — Winnie Yip

(74) *Attorney, Agent, or Firm* — Adam D. Stevens; Kirton McConkie

(57) ABSTRACT

An improved white cane includes an elongate body having a proximal end adapted to be held by or secured to a human user and a distal tip, and a noise generator located proximate the distal tip, the noise generator being configured to generate sound within a range of frequencies audible to humans. The user is able to interpret differences in reflected sound as the white cane is moved about the user's surroundings to obtain more information about the surroundings than could be obtained using a normal white cane. Additionally, the information about the surroundings may become available to the user before that information might otherwise have been available to the user using a standard white cane.

20 Claims, 3 Drawing Sheets

(56) References Cited

U.S. PATENT DOCUMENTS

| | | | | |
|---|---|---|---|---|
| 2004/0036578 | A1 * | 2/2004 | Preston | G08B 7/06 340/321 |
| 2007/0005245 | A1 * | 1/2007 | Ellis | A61H 3/061 701/469 |
| 2008/0251110 | A1 * | 10/2008 | Pede | A61H 3/061 135/66 |
| 2011/0037560 | A1 * | 2/2011 | Belloteau | A61H 3/061 340/4.1 |
| 2013/0346021 | A1 * | 12/2013 | Stevens | A45B 3/00 702/160 |
| 2015/0070479 | A1 * | 3/2015 | Yu | G09B 21/003 348/62 |

* cited by examiner

WHITE CANE NAVIGATIONAL DEVICE FOR THE VISUALLY IMPAIRED

CROSS-REFERENCE TO RELATED APPLICATIONS

This application claims the benefit of U.S. Provisional Application No. 62/074,522, filed Nov. 3, 2014.

BACKGROUND OF THE INVENTION

1. Field of the Invention

The present invention relates to navigational devices for use by the visually impaired and specifically to improved white cane devices having a white or pink noise generator incorporated into the tip thereof.

2. Background and Related Art

A white cane is used by many people who are blind or visually impaired. Its primary uses are typically as a mobility tool and as a courtesy to others. White canes obtained their name from the white coloring that was historically adopted for mobility canes to improve the ability of others to see that a mobility cane is in use. There are various varieties of white canes serving slightly different needs. A traditional white cane, also known as a long cane or "Hoover" cane after Dr. Richard Hoover, is designed primarily as a mobility tool used to detect objects in the path of a user. Cane length of a traditional white cane depends on the height of the user, and traditionally extends from the floor to the user's sternum, although some favor the use of even longer canes.

A guide cane is a shorter cane that generally extends from the floor to the user's waist, thus having a more limited mobility function. A guide cane is most useful for scanning for curbs and steps, but can also be used diagonally across the body for protection, warning the user of obstacles immediately ahead. An identification cane (ID cane) is used primarily to alert others as to the bearer's visual impairment. The ID cane is often a lighter and shorter cane and may have no use as a mobility tool.

A support cane may be designed primarily to offer physical stability to a visually impaired user. The support cane may also work as a means of identification by virtue of its color. The support cane has limited potential as a mobility device other than through the physical support offered to the user. A kiddie cane works the same as an adult long cane, but is sized and designed for use by children.

The various white canes are often made from aluminum, graphite-reinforced plastic, other fiber-reinforced plastics, and the like. White canes can come with a variety of tips depending upon user preference. Additionally, white canes can be either collapsible or straight: the lightness and greater strength of the straight canes allows greater mobility and safety, though collapsible canes can be stored with more ease for some advantages in crowded areas.

Dr. Richard Hoover first developed what is now the standard method of long cane training. The basic technique is to swing the cane from the center of the body back and forth before the feet—the cane should be swept before the rear foot as the person steps. While this method is helpful in identifying obstacles and dangers to the visually-impaired user, the method has certain limitations.

For example, use of the Hoover method with existing white canes is limited to detection of objects that come in physical contact with the sweeping white cane. If the white cane passes underneath an obstacle that is located in the path of the user but does not extend to the ground, the visually impaired user may not become aware of the obstacle before a portion of his or her body strikes the obstacle. The use of existing standard white canes is also limited in that the range of detection of obstacles is limited to the length of the white cane.

Attempts have been made to try to address the limitations of traditional white canes. One mechanism that has been attempted to address these limitations is to incorporate sensors into white canes that allow for longer-range detection of obstacles with some sort of feedback to the visually-impaired user. For example, ultrasonic and/or radar generators paired with appropriate detectors have been incorporated into certain white canes to permit the white cane itself to detect upcoming obstacles not within the range of physical contact with the white cane. The white cane then can provide some sort of feedback to the visually impaired user, such as auditory feedback (beeps, spoken warnings, and the like) and tactile feedback (such as through haptic technology incorporated into a handle of the white cane).

Despite the advances promised by such attempts at improvements to traditional white canes, significant problems still remain. Generally, the attempted improvements greatly increase the complexity of the white cane and its manufacture, with accompanying increases in cost as well as weight. The current systems are also fairly complex, as the systems generally require the white cane itself to identify an obstacle, determine the location/distance of the identified obstacle, and determine when and how to notify the visually impaired user. Haptic notification systems are often non-intuitive and require significant training for the visually impaired user to learn how to interpret the white cane's notification of an impending obstacle. Audible notification systems may become annoying both to the visually impaired user as well as to others in the general vicinity of the white cane, especially in quiet environments.

The at times greatly increased weight of the modified white canes increases the difficulty of use of the white cane. In the short term, the user may have to use increased force to utilize the Hoover method for sweeping the white cane from side to side. In the long term, the user may suffer from increased fatigue. The complexity of the modified white canes may lead to other problems, including a possibility of failure of the detection devices at any number of points, which may result in complete failure of the incorporated detection and notification system.

In many cases, the attempts at improving the traditional white canes still fail to address many of the problems encountered by users of traditional white canes. The white canes incorporating active detection features may fail to identify certain types of obstacles or hazards, including obstacles or hazards in the visually impaired user's path that fail to extend downward sufficiently for proper detection.

In short, existing attempts to improve traditional white cane have failed to address the needs of the visually impaired community.

BRIEF SUMMARY OF THE INVENTION

According to implementations of the invention, an improved white cane includes an elongate body having a proximal end adapted to be held by or secured to a human user and a distal tip. The improved white cane also includes a noise generator located proximate the distal tip, the noise generator being configured to generate sound within a range of frequencies audible to humans. The sound generated and emitted by the noise generator is audible to the visually impaired user, and allows the user to detect changes in sound reflected from the surroundings of the tip of the white cane. As the user sweeps the tip of the white cane from side to side using a traditional or modified Hoover method, the changes in reflected noise returning to the user after having been emitted from the noise generator and reflected from the user's surrounding allow the user to mentally construct an auditory map of his or her surroundings that is much more accurate and complete than can be generated by any previous white cane. It is expected that this benefit and result can generally be achieved with minimal training on the part of the user.

The improved white cane may further include a power source operatively connected to the noise generator. The white cane may further include a power switch operatively connected to the noise generator so as to allow a user of the white cane to turn the noise generator on and off. The power switch may be located at any location on the white cane, including proximate the proximal end of the body. Alternatively, the power switch may be a wireless power switch removed from or removable from the white cane to permit more discrete operation of the white cane.

The improved white cane may further include a volume control operatively connected to the noise generator so as to allow a user of the white cane to adjust a volume of the noise generator. The volume control may be located at any location on the white cane, including proximate the proximal end of the body. Alternatively, the volume control may be a wireless volume control removed from or removable from the white cane to permit more discrete operation of the white cane.

The noise generator may generate any type of noise adapted to permit the user to unobtrusively gain an auditory understanding of his or her surroundings by using the improved white cane. By way of example, the noise generator may generate any one or more of white noise, pink noise, red or Brownian noise, or grey noise, and may do so over the entire range of frequencies generally understood as being audible to humans (e.g. approximately 20-20,000 Hertz), or over any subset of frequencies generally understood as being audible to humans (e.g. some range of frequencies smaller than 20-20,000 Hertz but falling approximately within the range of 20-20,000 Hertz). The noise generator may also generate clicks or other appropriate sounds.

The improved white cane may have a non-collapsible straight body or it may have a collapsible body. The noise generator may be incorporated into the body proximate the distal tip, or it may be attached to the body proximate the distal tip.

According to additional implementations of the invention, an improved white cane includes an elongate body having a proximal end adapted to be held by or secured to a human user and a distal tip. The white cane also includes a noise generator located proximate the distal tip, the noise generator being configured to emit noise within a range of frequencies audible to humans, such as clicks, white noise, pink noise, red or Brownian noise, or grey noise.

The improved white cane may also include a power source and a power switch, and the power source and the power switch may be as described above. Where the power source and power switch are present, the noise generator, power source and power switch are operatively connected so as to allow a user of the white cane to operate the power switch to turn the noise generator on and off. The power switch may be located at any appropriate location, including proximate the proximal end of the body, proximate the noise generator, another location along the body, and removed from the body (e.g. a wireless power switch).

The improved white cane may also include a volume control operatively connected to the noise generator so as to allow a user of the white cane to adjust a volume of the noise generator. The volume control may be located at any appropriate location, including proximate the proximal end of the body, proximate the noise generator, another location along the body, and removed from the body (e.g. a wireless power switch).

As described above, the range of frequencies audible to humans may be a subset of frequencies less than the entire range of frequencies audible to humans.

According to further implementations of the invention, an improved white cane includes an elongate body having a proximal end adapted to be held by or attached to a human user and a distal tip. The white cane further includes a noise generator located proximate the distal tip, the noise generator being configured to emit noise within a range of frequencies audible to humans, such as clicks, white noise, pink noise, red or Brownian noise, or grey noise. The white cane further includes a power source and a power switch, wherein the power source, power switch, and noise generator are operatively connected so as to allow a user of the white cane to operate the power switch to turn the noise generator on and off.

The power source and power switch may be located at any appropriate location, as discussed above. The power source may include a user-replaceable power source (e.g. a battery) or a rechargeable power source. Where a rechargeable power source is provided, the rechargeable power source may be user-replaceable (as in a removable rechargeable battery) or not. Especially where a rechargeable power source is not user-replaceable (but also otherwise), the improved white cane may include a physical or wireless connection to permit recharging of the power source, or alternatively the improved white cane may include a mechanism to permit recharging of the power source, such as a kinetic charging device that charges the power source by way of converting kinetic energy of motion of the white cane into potential energy stored by the power source.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
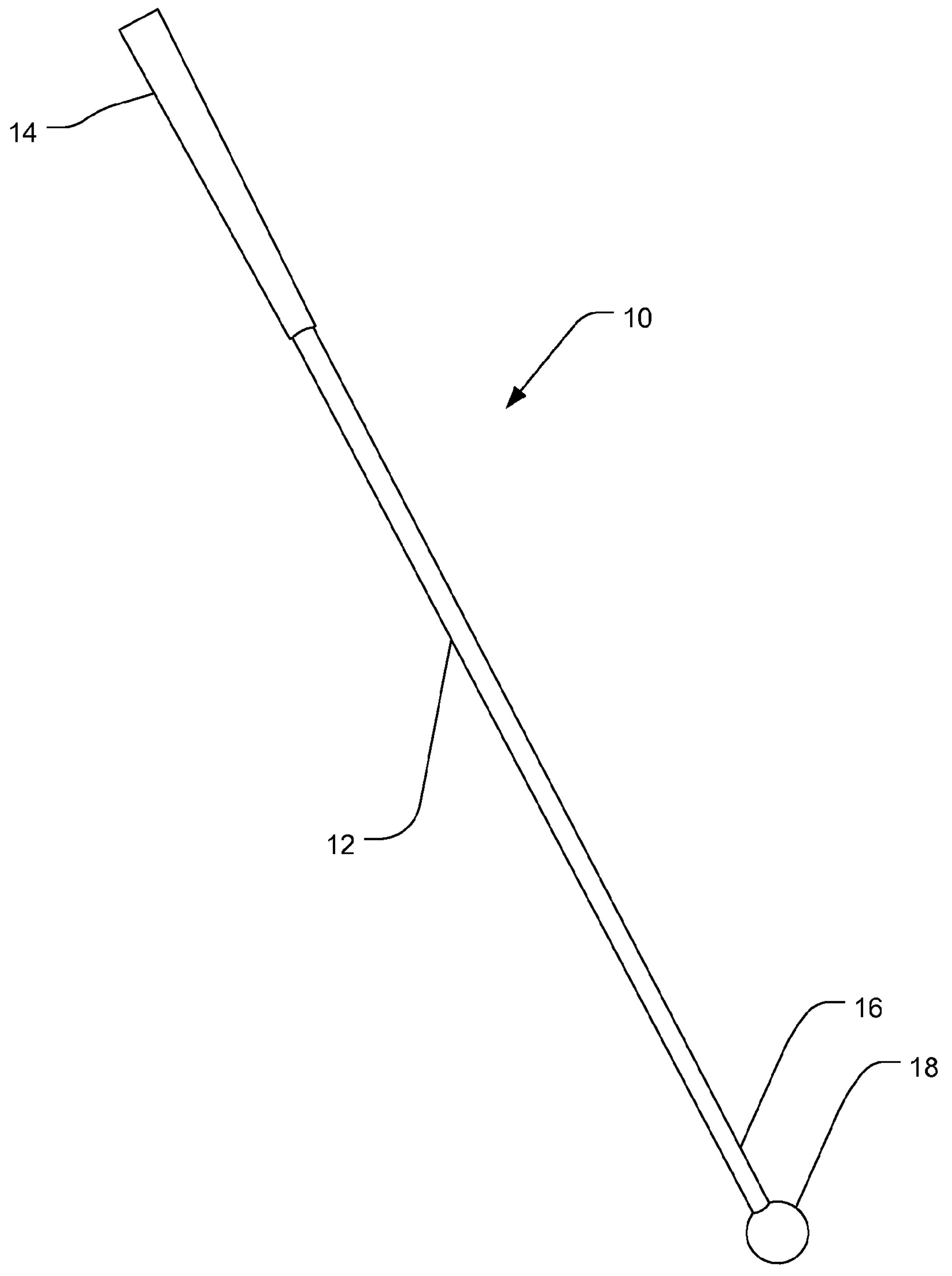
FIG. 1 shows an illustrative white cane.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

According to embodiments of the invention, an improved white cane includes an elongate body having a proximal end adapted to be held by or secured to a human user and a distal tip. The improved white cane also includes a noise generator located proximate the distal tip, the noise generator being configured to generate sound within a range of frequencies audible to humans. The sound generated and emitted by the noise generator is audible to the visually impaired user, and allows the user to detect changes in sound reflected from the surroundings of the tip of the white cane. As the user sweeps the tip of the white cane from side to side using a traditional or modified Hoover method, the changes in reflected noise returning to the user after having been emitted from the noise generator and reflected from the user's surrounding allow the user to mentally construct an auditory map of his or her surroundings that is much more accurate and complete than can be generated by any previous white cane. It is expected that this benefit and result can generally be achieved with minimal training on the part of the user.

The improved white cane may further include a power source operatively connected to the noise generator. The white cane may further include a power switch operatively connected to the noise generator so as to allow a user of the white cane to turn the noise generator on and off. The power switch may be located at any location on the white cane, including proximate the proximal end of the body. Alternatively, the power switch may be a wireless power switch removed from or removable from the white cane to permit more discrete operation of the white cane.

The improved white cane may further include a volume control operatively connected to the noise generator so as to allow a user of the white cane to adjust a volume of the noise generator. The volume control may be located at any location on the white cane, including proximate the proximal end of the body. Alternatively, the volume control may be a wireless volume control removed from or removable from the white cane to permit more discrete operation of the white cane.

The noise generator may generate any type of noise adapted to permit the user to unobtrusively gain an auditory understanding of his or her surroundings by using the improved white cane. By way of example, the noise generator may generate any one or more of white noise, pink noise, red or Brownian noise, or grey noise, and may do so over the entire range of frequencies generally understood as being audible to humans (e.g. approximately 20-20,000 Hertz), or over any subset of frequencies generally understood as being audible to humans (e.g. some range of frequencies smaller than 20-20,000 Hertz but falling approximately within the range of 20-20,000 Hertz). Additionally or alternatively, the noise generator may generate other types of noise, such as clicks and other sounds.

The improved white cane may have a non-collapsible straight body or it may have a collapsible body. The noise generator may be incorporated into the body proximate the distal tip, or it may be attached to the body proximate the distal tip.

According to additional embodiments of the invention, an improved white cane includes an elongate body having a proximal end adapted to be held by or secured to a human user and a distal tip. The white cane also includes a noise generator located proximate the distal tip, the noise generator being configured to emit noise within a range of frequencies audible to humans, such as clicks, white noise, pink noise, red or Brownian noise, or grey noise.

The improved white cane may also include a power source and a power switch, and the power source and the power switch may be as described above. Where the power source and power switch are present, the noise generator, power source and power switch are operatively connected so as to allow a user of the white cane to operate the power switch to turn the noise generator on and off. The power switch may be located at any appropriate location, including proximate the proximal end of the body, proximate the noise generator, another location along the body, and removed from the body (e.g. a wireless power switch).

The improved white cane may also include a volume control operatively connected to the noise generator so as to allow a user of the white cane to adjust a volume of the noise generator. The volume control may be located at any appropriate location, including proximate the proximal end of the body, proximate the noise generator, another location along the body, and removed from the body (e.g. a wireless power switch).

As described above, the range of frequencies audible to humans may be a subset of frequencies less than the entire range of frequencies audible to humans.

According to further embodiments of the invention, an improved white cane includes an elongate body having a proximal end adapted to be held by or attached to a human user and a distal tip. The white cane further includes a noise generator located proximate the distal tip, the noise generator being configured to emit noise within a range of frequencies audible to humans, such as clicks, white noise, pink noise, red or Brownian noise, or grey noise. The white cane further includes a power source and a power switch, wherein the power source, power switch, and noise generator are operatively connected so as to allow a user of the white cane to operate the power switch to turn the noise generator on and off.

The power source and power switch may be located at any appropriate location, as discussed above. The power source may include a user-replaceable power source (e.g. a battery) or a rechargeable power source. Where a rechargeable power source is provided, the rechargeable power source may be user-replaceable (as in a removable rechargeable battery) or not. Especially where a rechargeable power source is not user-replaceable (but also otherwise), the improved white cane may include a wired or wireless connection to permit recharging of the power source, or alternatively the improved white cane may include a mechanism to permit recharging of the power source, such as a kinetic charging device that charges the power source by way of converting kinetic energy of motion of the white cane into potential energy stored by the power source.

FIG. 1 shows an illustrative white cane 10. The white cane 10 includes an elongate body 12 that has a proximal end 14 and a distal end 16. The distal end 16 may be fitted with a tip 18. The tip 18 may take any desired form known in the white cane art. The proximal end 14 is adapted to be held by or secured to a human user, in this case forming a handle. The material of the elongate body 12 and of the handle may be selected according to considerations known in the white cane art. The body 12 may optionally be hollow, and while the body 12 is illustrated in FIG. 1 as being of a single piece, the body 12 may also optionally be collapsible.

Figure 2:
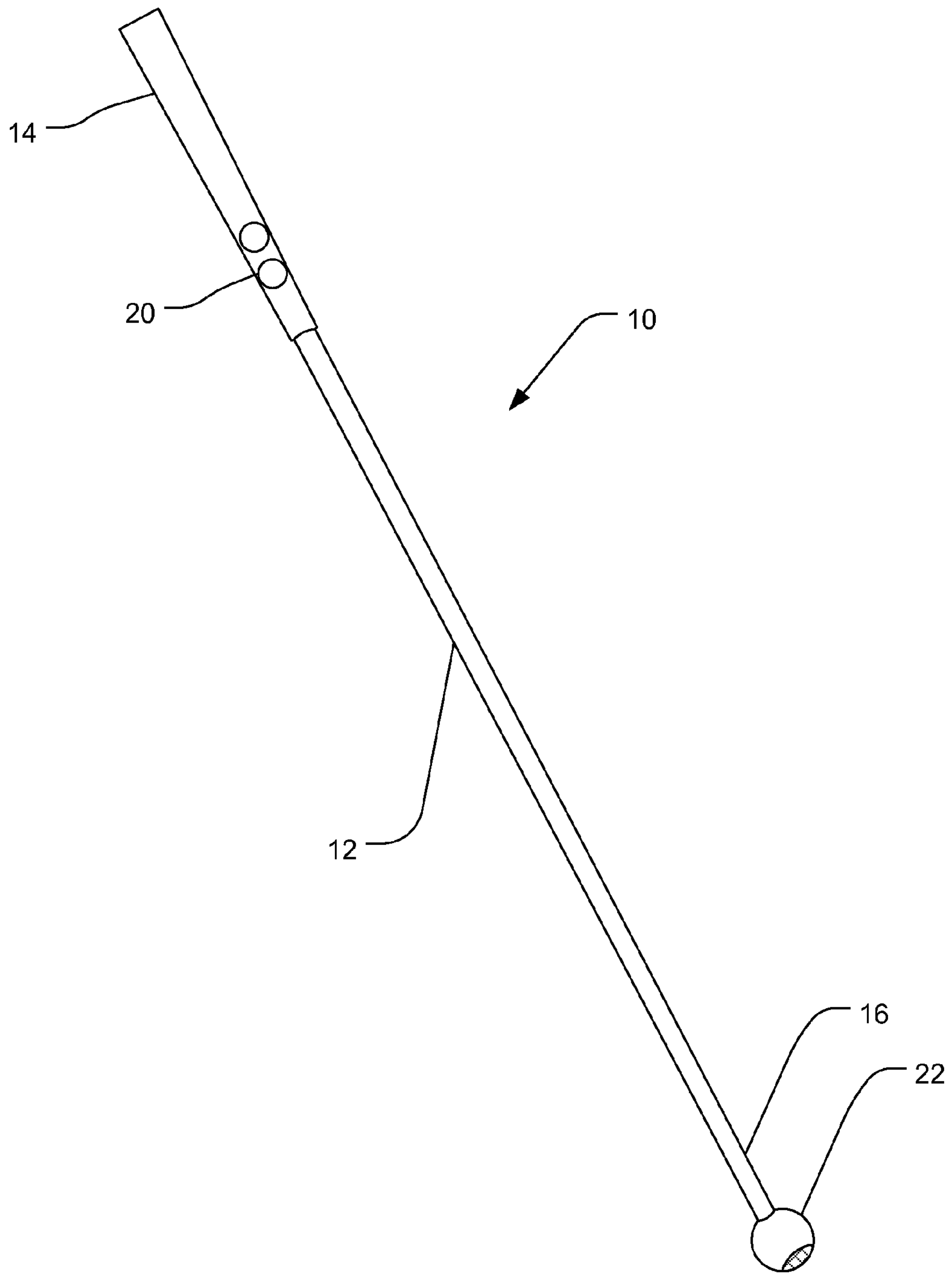
FIG. 2 shows an illustrative white cane with an illustrative noise generator.

FIG. 2 shows an illustrative white cane 10 that incorporates features in accordance with the principles discussed herein. The handle of the white cane 10 incorporates one or more control elements 20, the control elements 20 allow the user to readily control the noise-generating features of the white cane 10. The control elements, where present, may include any type or functionality of control elements, including switches to turn the sound production on and off, volume adjustments, and the like. In the illustration of FIG. 2, the tip 18 of FIG. 1 has been replaced by a noise-generating tip 20 that incorporates or is operatively connected to a noise generator.

A noise generator may have several components. One component of a noise generator may be a signal generator, and another component of a noise generator may be a transducer for transducing electrical signals from the signal generator into audible noise. The signal generator may be configured to create noise within a range of frequencies generally audible to a human ear. For the most part, humans are able to hear sound at frequencies between approximately 20 to 20,000 Hertz. For purposes of the embodiments of the invention, however, the signal generator need not create noise over the entire range of frequencies audible to the human ear. Instead, the signal generator may generate noise over a narrower range of frequencies for any of a variety of reasons. For example, the signal generator might only generate noise over a range of frequencies that the transducer can efficiently produce at an acceptable volume. Thus, the signal generator may generate noise over any subset of frequencies audible to the human ear.

Over the range of frequencies of interest, the signal generator may generate any of a variety of noise. By way of example, the signal generator may generate a signal corresponding to or approximating white noise (a random signal with a constant power spectral density) within the range of frequencies of interest. As another example, the signal generator may generate a signal corresponding to or approximating pink noise (a random signal with each doubling in frequency carries an equal amount of noise power, so the power density decreases by 3 dB per octave) within the range of frequencies of interest. As another example, the signal generator may generate a signal corresponding to or approximating red or Brownian noise (random noise having a power density that decreases by 6 dB per octave) within the range of frequencies of interest. As another example, the signal generator may generate a signal corresponding to or approximating grey noise (random noise subjected to a psychoacoustic equal loudness curve) over the range of frequencies of interest. As another example, the signal generator may generate a click or series of clicks, or some other short-duration noise or series of short-duration noises. The foregoing examples are not intended to limit the types of signals that could be generated to produce a desirable type of noise, including but not necessarily limited to blue noise, violet noise, green noise, black noise, noisy white noise, and noisy black noise.

The transducer is operatively connected to the signal generator, and transduces the electrical signal into noise. The transducer may be any appropriate type and size of transducer that can adequately produce the desired noise at a desired volume and over the desired range of frequencies. To keep the weight of the cane 10 low, the signal generator and the transducer are generally made small and light. Where weight is less of a concern, the signal generator and the transducer may be made larger. The signal generator and the transducer are powered by a power source, which may be any type of power source known in the art, including single-use power sources (e.g. non-rechargeable batteries) and multiple-use power sources (e.g. rechargeable batteries, capacitors, and the like). The power source may be operatively coupled to a charging mechanism such as a wired connector adapted to receive a charging device (e.g., a power supply) or a wireless connector to permit wireless charging (e.g., an induction charging device). If desired, the power source and/or signal generator may be located distally from the transducer to achieve a desired balance of the white cane 10, and may be connected to the transducer via wires, including wires that may be disposed within a cavity of the body 12.

While FIG. 2 shows the noise generator 22 (or at least the transducer portion thereof) being located at the extreme distal end of the white cane 10, the noise generator 22 or any of the various components of the noise generator 22 may be located at any functional location along the white cane 10. The noise generator 22 or any of the various components of the noise generator 22 may be located on any portion of the white cane 10, or it may be located in the white cane 10 at any location thereof. Generally, however, the noise generator 22 (or at least the transducer portion thereof) will be located more or less proximate the distal end 16 of the white cane 10, such as within the distal third of the white cane 10, the distal quarter of the white cane 10, the distal sixth of the white cane 10, or the like. Distal placement of the noise generator 22 or transducer portion thereof increases the user's ability to use the noise generator 22 to explore his or her surroundings by movement of the white cane 10.

In some embodiments, existing white canes 10 can be modified to function as discussed herein, such as using a kit containing the noise-generating components and controls discussed herein for affixation to a standard white cane 10. In such a situation, the various components will likely be attached to outer surfaces of the white cane 10, unless access to a hollow portion of the white cane 10 is available.

Figure 3:
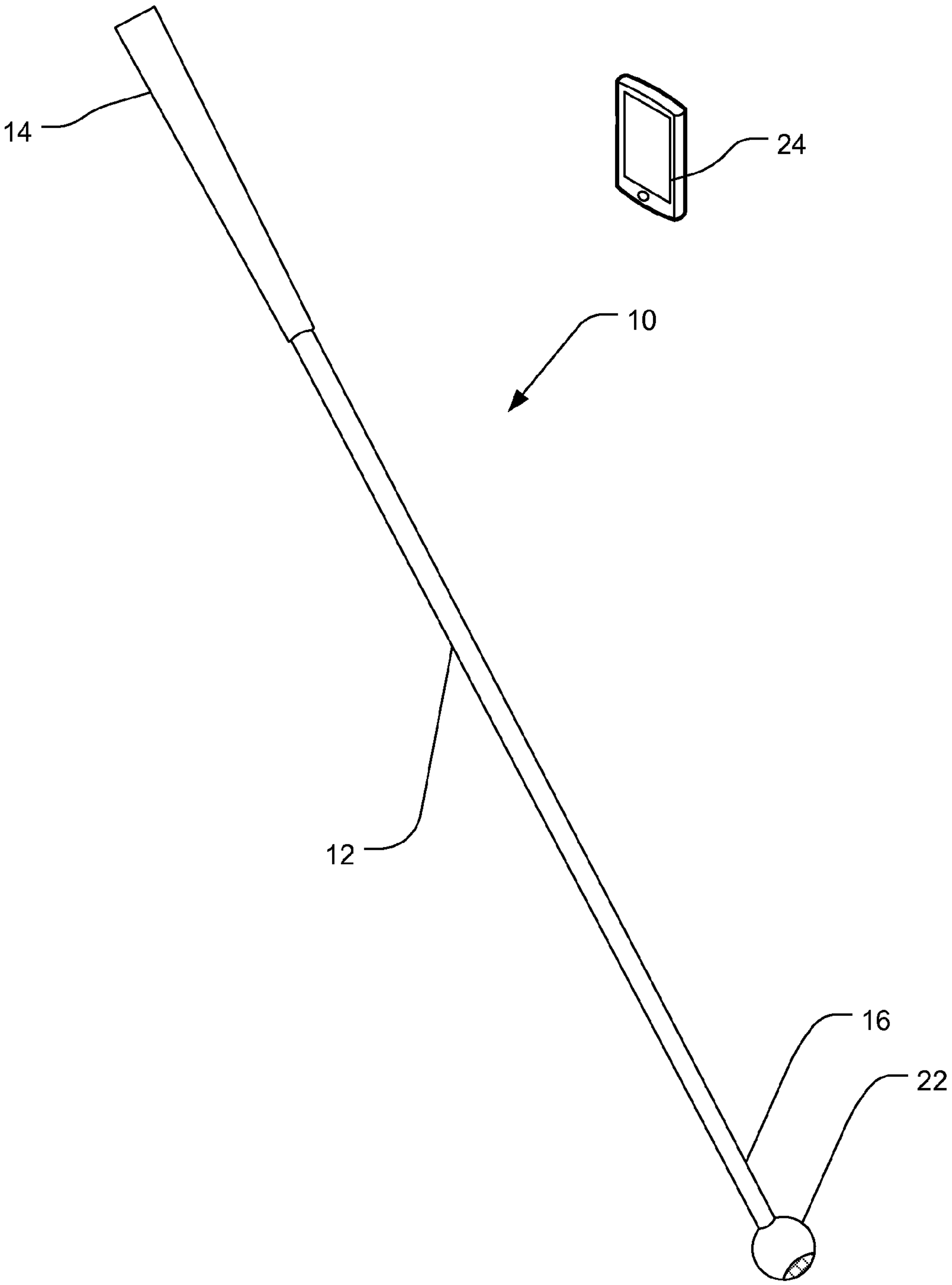
FIG. 3 shows an alternate illustrative white cane with an illustrative noise generator.

In certain embodiments of the invention, the noise generator 22 may be operatively coupled to an external device, wherein the external device provides one or more functions to the white cane. The operative coupling between the external device and the noise generator 22 may be via a wired or wireless connection. One example of such an embodiment is illustrated in FIG. 3, where a smart phone 24 is illustrated as being within wireless communicative range of the white cane 10. The smart phone is intended to be illustrative of an exemplary wireless device, and any general or custom-purpose device capable of communication with the white cane 10 could be used. In this example, the user of the white cane 10 may use features of the smart phone 24 (or other device) to control the noise generator 22. For example, the user could use the smart phone 24 to turn the noise generator 22 on or off, to control the volume of the noise generator 22, to modify the type of noise being emitted by the noise generator, and the like. In certain embodiments, the smart phone 24 or other device could be tasked with generating the signal to be transduced by the transducer, and with transmitting the signal to the white cane 10. One advantage of such an embodiment is that the control elements 20 shown in the embodiment of FIG. 2 may be omitted in favor of external control elements on the smart phone 24 or other device. The embodiments of FIGS. 2 and 3 illustrate that there are a variety of ways in which the functions of the improved white cane 10 may be distributed within and to the white cane 10 and to a separate device operably connected to the white cane 10.

Embodiments of the invention therefore provide an inexpensive mechanism to improve standard white canes. The systems rely on the unparalleled ability of the human brain to process changes in reflected sound to convey more information about the user's surroundings than would otherwise be known simply using an existing white cane. The use of noise in the manner described herein will generally not be objectionable to others in the area of the user, and where it becomes objectionable, the user may be able to turn the volume down or to discontinue use of the noise features, while still being able to use the white cane in a normal fashion.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A white cane comprising:

an elongate body having a proximal end adapted to be held by or secured to a human user, and a distal tip;

a signal generator configured to generate an audio signal adapted for use in acoustic wayfinding; and a noise generator comprising a transducer operatively connected to the signal generator and located proximate the distal tip, the noise generator being configured to generate sound within a range of frequencies audible to humans.

2. A white cane as recited in claim 1, further comprising a power source operatively connected to the noise generator.

3. A white cane as recited in claim 1, further comprising a power switch operatively connected to the noise generator so as to allow a user of the white cane to turn the noise generator on and off.

4. A white cane as recited in claim 3, wherein the power switch is located proximate the proximal end of the body.

5. A white cane as recited in claim 1, further comprising a volume control operatively connected to the noise generator so as to allow a user of the white cane to adjust a volume of the noise generator.

6. A white cane as recited in claim 5, wherein the volume control is located proximate the proximal end of the body.

7. A white cane as recited in claim 1, wherein the noise generator comprises a pink noise generator.

8. A white case as recited in claim 1, wherein the noise generator comprises a white noise generator.

9. A white cane as recited in claim 1, wherein the body comprises a non-collapsible straight body.

10. A white cane as recited in claim 1, wherein the body comprises a collapsible body.

11. A white cane as recited in claim 1, wherein the noise generator is incorporated into the body proximate the distal tip.

12. A white cane as recited in claim 1, wherein the noise generator is attached to the body proximate the distal tip.

13. A white cane comprising:

an elongate body having a proximal end adapted to be held by or secured to a human user, and a distal tip; and a noise generator located proximate the distal tip, the noise generator being configured to emit noise within a range of frequencies audible to humans and selected from the group consisting of white noise, pink noise, red or Brownian noise, and grey noise.

14. A white cane as recited in claim 13, further comprising:

a power source; and a power switch;

wherein the noise generator, power source and power switch are operatively connected so as to allow a user of the white cane to operate the power switch to turn the noise generator on and off.

15. A white cane as recited in claim 14, wherein the power switch is located at a location selected from the group consisting of proximate the proximal end of the body and proximate the noise generator.

16. A white cane as recited in claim 13, further comprising a volume control operatively connected to the noise generator so as to allow a user of the white cane to adjust a volume of the noise generator.

17. A white cane as recited in claim 16, wherein the volume control is located at a location selected from the group consisting of proximate the proximal end of the body and proximate the noise generator.

18. A white cane as recited in claim 13, wherein the range of frequencies audible to humans is a subset of frequencies less than the entire range of frequencies audible to humans.

19. A white cane comprising:

an elongate body having a proximal end adapted to be held by or secured to a human user, and a distal tip;

a noise generator located proximate the distal tip, the noise generator being configured to emit noise within a range of frequencies audible to humans and selected from the group consisting of white noise, pink noise, red or Brownian noise, and grey noise;

a power source; and a power switch;

wherein the power source, power switch, and noise generator are operatively connected so as to allow a user of the white cane to operate the power switch to turn the noise generator on and off.

20. A white cane as recited in claim 19, wherein the power source comprises a power source selected from the group consisting of a user-replaceable power source and a rechargeable power source.

* * * * *